United States Patent [19]

Lessway

[11] Patent Number: 4,647,097
[45] Date of Patent: Mar. 3, 1987

[54] I.D. OR O.D. PARALLEL GRIPPER

[75] Inventor: Richard J. Lessway, Farmington Hills, Mich.

[73] Assignee: Arobotech Systems, Inc., Warren, Mich.

[21] Appl. No.: 759,095

[22] Filed: Jul. 25, 1985

[51] Int. Cl.[4] ............................................. B25J 15/08
[52] U.S. Cl. ...................................... 294/88; 294/94; 294/119.1; 294/902; 901/37; 901/39
[58] Field of Search ..................... 294/86.4, 88, 93, 94, 294/106, 115, 103.1, 116, 119.1, 902; 51/103 R, 103 WH, 238 S; 82/38 R, 39; 269/32, 34; 409/165; 901/30–39

[56] References Cited

U.S. PATENT DOCUMENTS 4,399,639  8/1983  Lessway ............................. 409/165
4,518,187  5/1985  Blatt et al. ................. 294/119.1 X

FOREIGN PATENT DOCUMENTS 632547  11/1978  U.S.S.R. ................................. 901/37

Primary Examiner—Johnny D. Cherry
Attorney, Agent, or Firm—Robert G. Mentag

[57] ABSTRACT

A gripping apparatus including a housing in which is slidably mounted a longitudinally movable operator body. A pair of gripper arms are slidably mounted on the operator body. Each gripper arm carries a gripper jaw engageable with a workpiece. The gripper jaws are moved along straight line travel paths into gripping engagement with a workpiece when the operator body is moved in one longitudinal direction, and they are correspondingly disengaged from the workpiece when the operator body is moved in the other longitudinal direction.

7 Claims, 12 Drawing Figures

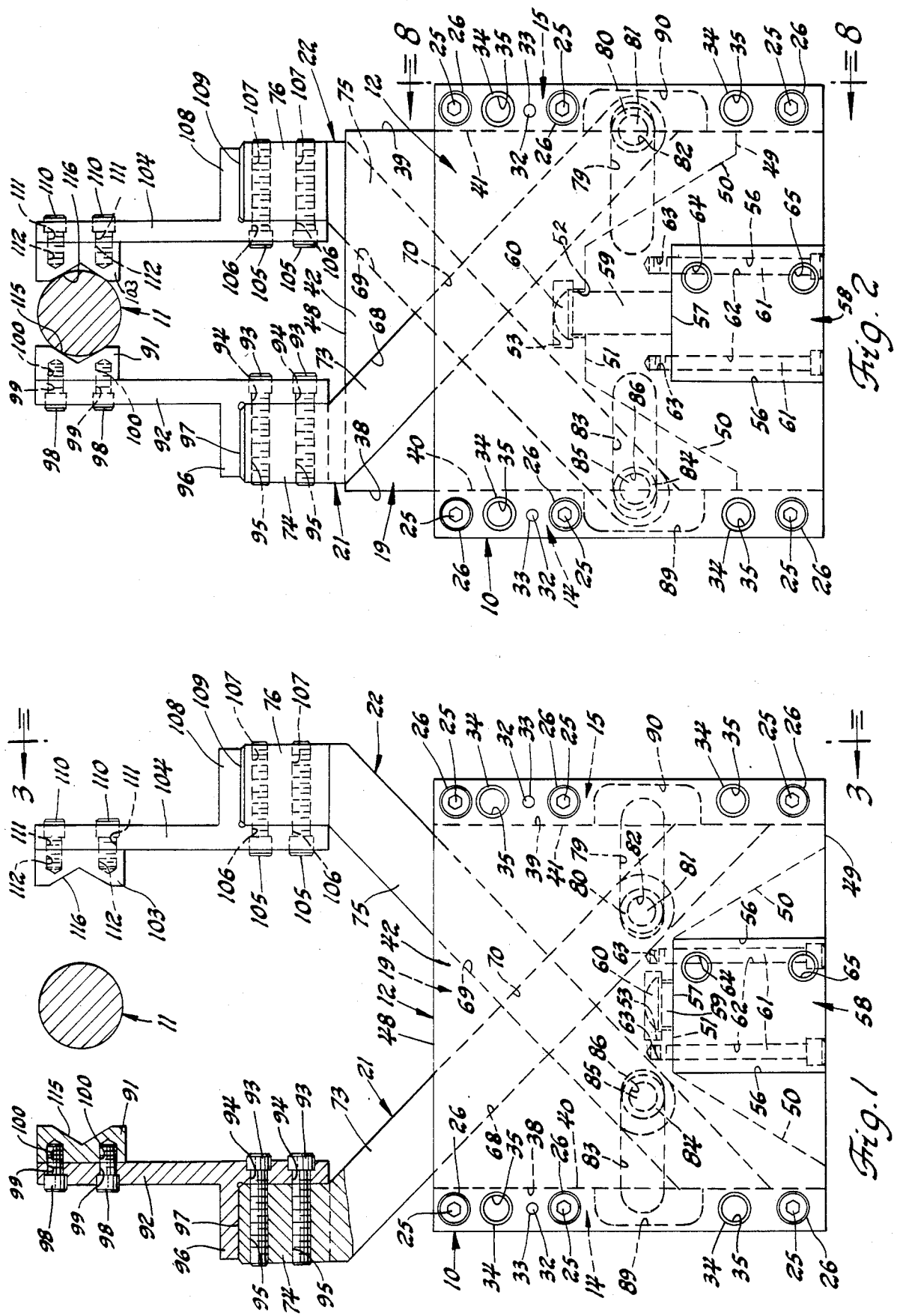

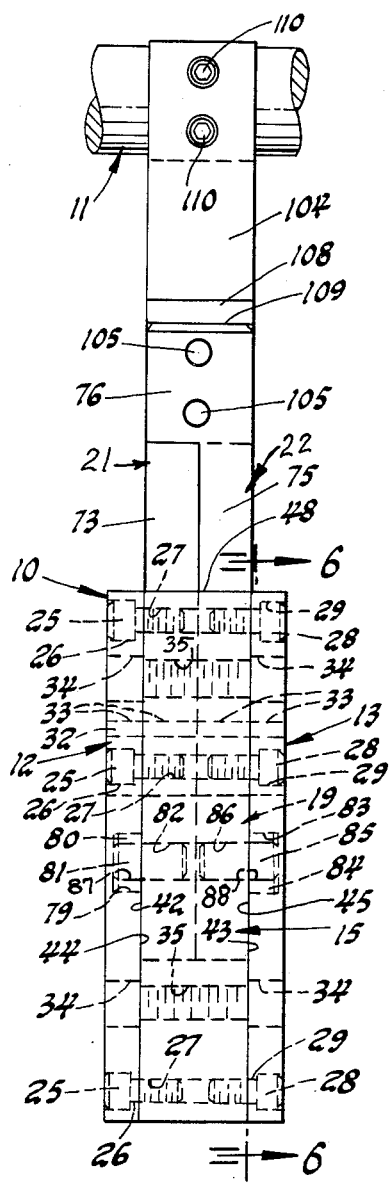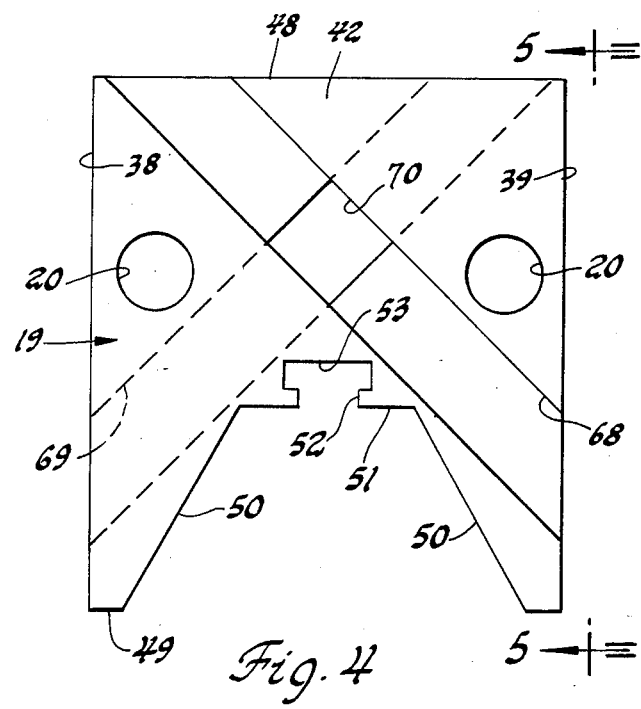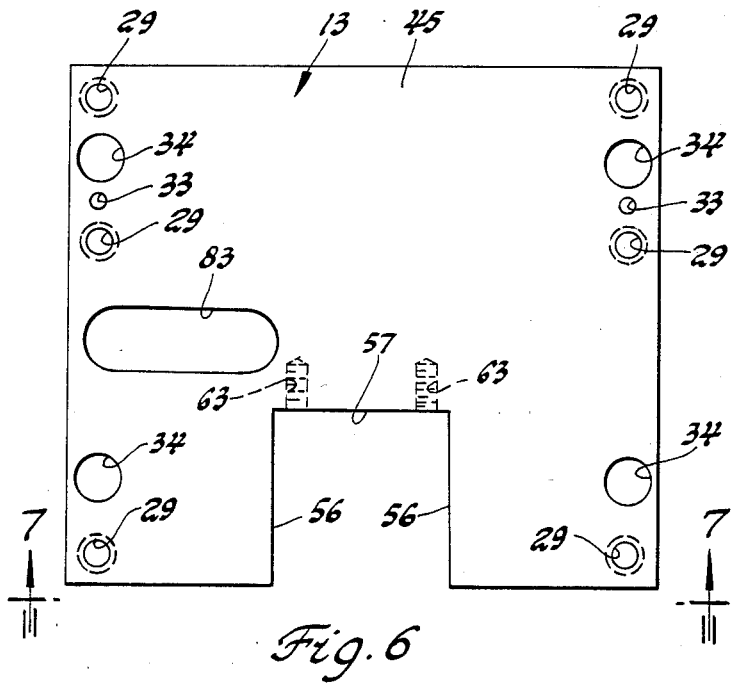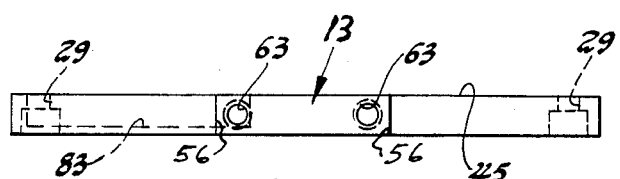

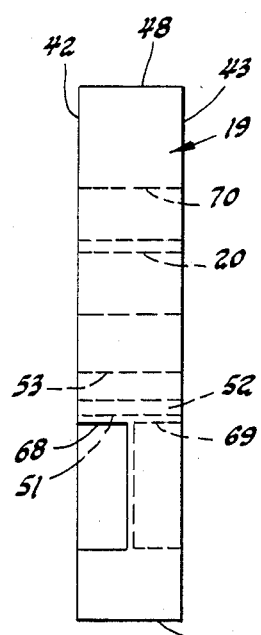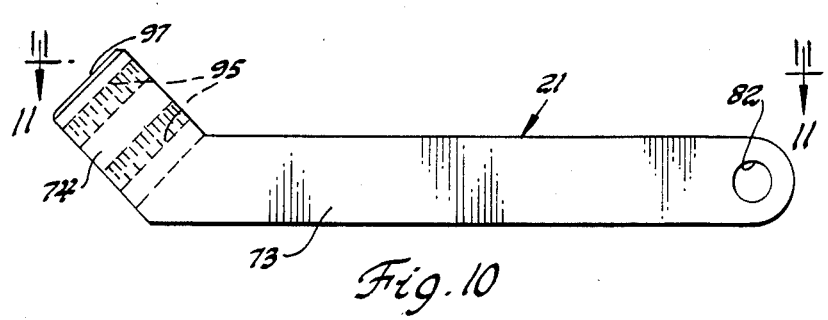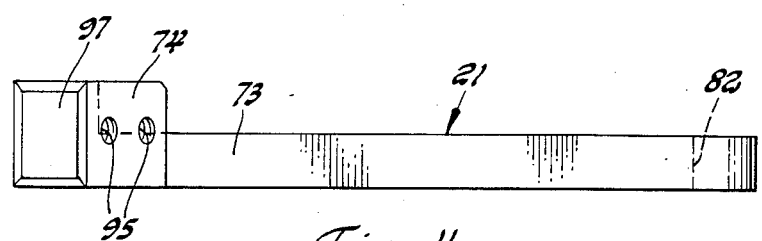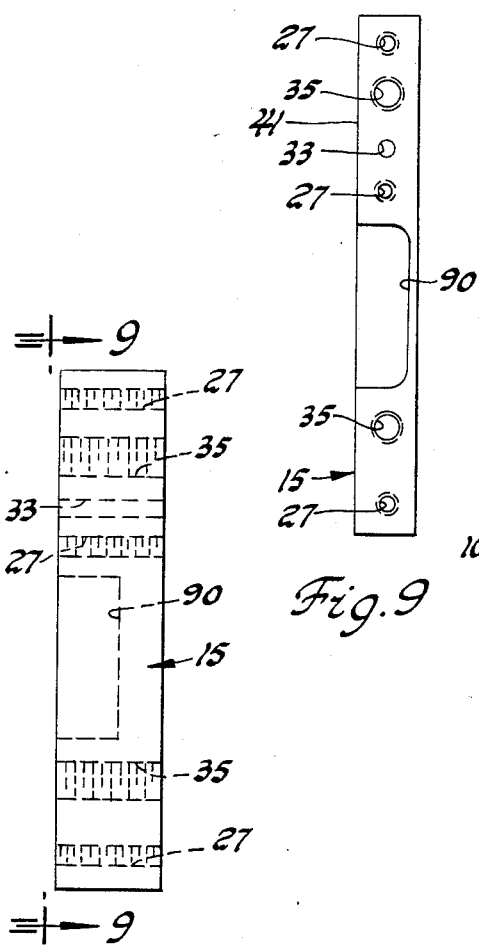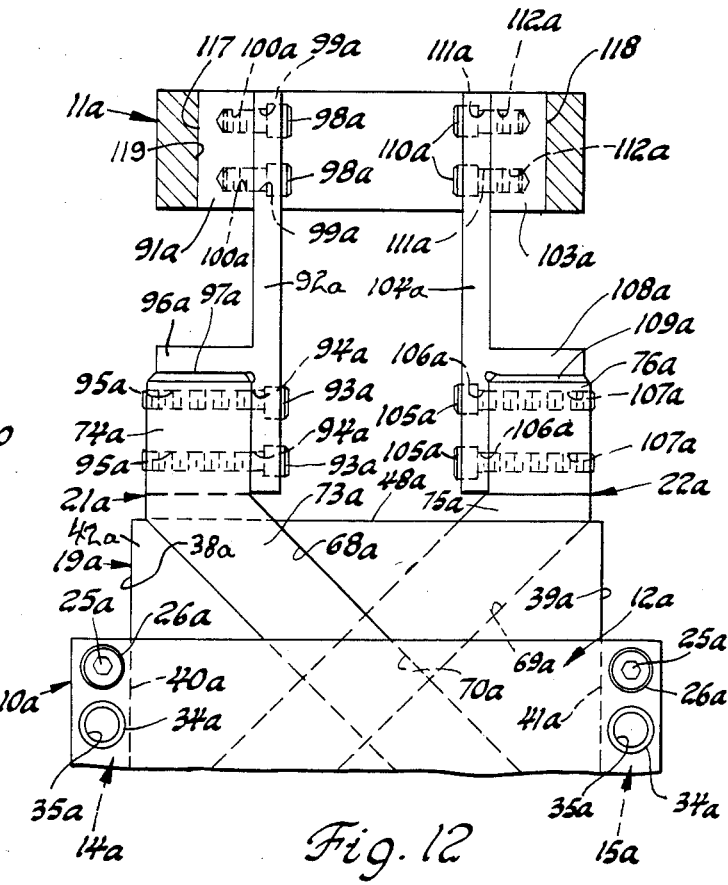

I.D. OR O.D. PARALLEL GRIPPER

BACKGROUND OF THE INVENTION

1. Technical Field

The field of art to which this invention pertains may be generally located in the class of devices relating to grippers or gripping devices.

2. Background Information

It is known in the robot gripper art to provide parallel motion grippers for gripping workpieces to move the workpiece between selected positions. A disadvantage of some of the prior art grippers is that, although it is advertised that they provide a parallel motion, the gripper arms for such grippers move in an arc. Accordingly, if the gripper arms on such grippers have a V-shaped gripping jaw or finger, then it is necessary to reprogram the controls for the gripping apparatus for each size workpiece, since with different diameters, the V-shaped jaws will be at different positions along the arcuate path through which the gripper jaws are moved, making it necessary to reprogram the gripping apparatus for different diameter workpieces. There are some true parallel motion grippers on the market, but a disadvantage of the last mentioned grippers is that they basically work off a wedge means, which provides only a very short stroke or movement for the gripping jaws. A disadvantage of the last mentioned true parallel grippers is that they cannot be used for a wide range of different diameter workpieces and accordingly, they lack versatility. It is also known in the prior art to provide a true centering steady rest, having a center wear pad and two side wear pads for movement into supporting engagement with a workpiece, as shown in U.S. Pat. No. 4,399,639.

SUMMARY OF THE INVENTION

In accordance with the present invention, a true parallel gripping apparatus is provided which includes two gripper arms, which may be provided with either inner or outer diameter gripping jaws or fingers for gripping a workpiece, and moving it between selected locations or work positions. The gripping apparatus of the present invention is adapted to hold various size diameter workpieces, without the need for readjusting or reprogramming the controls for the gripping apparatus, and without having to repeatedly find the longitudinal center of a workpiece. The gripping apparatus of the present invention provides true parallel movements of the gripping jaws for engaging a workpiece, and it can grip workpieces of small or large diameters without any need for reprogramming the controls for the gripping apparatus, and it also provides high gripping forces for holding a workpiece while it is moved between work positions. The present invention is adaptable to many uses and applications involving the handling, holding or manipulating of workpieces. Particular examples are robot arm grippers, pick and place units, work holding fixtures or steady rests and gauging heads.

The gripping apparatus of the present invention is also constructed and arranged so that a plurality of the same can be used in a stacked arrangement, so that the number of movements of the robot necessary to load and unload a workpiece can be reduced. The robotic gripper apparatus of the present invention is compact in structure. It can be rotated about its longitudinal axis in a minimum of space, and it also has a flat configuration so that it can be moved down onto to a workpiece carrying device, such as a pallet, and pick up a workpiece laying on a pallet, in an efficient manner.

The gripping apparatus of the present invention comprises a housing which includes two side plates, a front cover plate, and a rear cover plate. A gripper operator body is slidably mounted inside of the housing, and it is operatively attached at its bottom end to a power means for moving the gripper operating body longitudinally in the housing. A pair of gripper arms are slidably mounted on the gripper operating body, and they are operatively connected to a cam means, whereby when the gripper operator body is moved longitudinally in a direction outwardly of the housing, toward a workpiece, the gripper arms are moved toward each other in a linear or parallel path into gripping engagement with a workpiece, and when the gripper operator body is moved in a direction inwardly of the housing, or away from the workpiece, the gripper arms are retracted along their respective linear or parallel travel paths from the workpiece to release the same.

BRIEF DESCRIPTION OF THE DRAWINGS

FIG. 1 is a front elevation view of a gripping apparatus such as a robotic gripper made in accordance with the principles of the present invention, and showing the gripper arms in a workpiece released position.

FIG. 2 is a front elevation view, identical to FIG. 1, but showing the gripper arms moved to a workpiece gripping position.

FIG. 3 is a right side elevation view of the gripper apparatus structure illustrated in FIG. 1, taken along the line 3—3 thereof, and looking in the direction of the arrows.

FIG. 4 is a front elevation view of the gripper operator body employed in the gripper apparatus illustrated in FIG. 1.

FIG. 5 is a right side elevation view of the gripper operated body structure illustrated in FIG. 4, taken along the line 5—5 thereof, and looking in the direction of the arrows.

FIG. 6 is an elevation view of the inside surface of the rear cover employed in the gripper apparatus illustrated in FIG. 3, taken along the line 6—6 thereof, and looking in the direction of the arrows.

FIG. 7 is a bottom plan view of the rear cover plate illustrated in FIG. 6, taken along the line 7—7 thereof, and looking in the direction of the arrows.

FIG. 8 is a right side elevation view of the gripper apparatus illustrated in FIG. 2, taken along the line 8—8, looking in the direction of the arrows, and showing the right side plate employed in the gripper apparatus structure of FIG. 2.

FIG. 9 is a left side elevation view of the right side plate structure illustrated in FIG. 8, taken along the line 9—9 thereof, and looking in the direction of the arrows.

FIG. 10 is a side view of one of the two identical gripper arms employed in the gripper apparatus illustrated in FIGS. 1 and 2.

FIG. 11 is a top plan view of the gripper arm structure shown in FIG. 10, taken along the line 11—11 thereof, and looking the direction of the arrows.

FIG. 12 is a fragmentary view of a modified gripper apparatus made in accordance with the principles of the present invention, and showing a gripper apparatus provided with inner diameter gripper jaws for gripping the inner diameter of a workpiece.

DESCRIPTION OF THE PREFERRED EMBODIMENTS

Referring now to the drawings, and in particular to FIG. 1, the numeral 10 generally designates an outer diameter parallel gripping or gripper apparatus made in accordance with the principles of the present invention. The numeral 11 designates an elongated cylindrical workpiece, as for example, an elongated shaft which is to be gripped on the outer diameter thereof and moved between selective work positions or locations. The gripper apparatus 10 may be used for moving the workpiece 11 between machining operation locations, assembly operation locations, or other manufacturing operation locations. It will be understood that the gripper apparatus 10 would be carried on a conventional robot arm, which in turn would be moved by a conventional robotic power means.

As shown in FIGS. 1 through 3, the gripper apparatus 10 of the present invention includes a housing comprising a front cover plate, generally indicated by the numeral 12, a rear cover plate, generally indicated by the numeral 13, and two left and right side plates, generally indicated by the numerals 14 and 15, respectively. The pair of front and rear cover plates 12 and 13 are identically formed, and are interchangeable. The left and right side plates 14 and 15, respectively, are also identical in structure and are interchangeable. The cover plates 12 and 13, and the side plates 14 and 15 are made from any suitable material, as for example, aluminum.

As best seen in FIGS. 2 and 4, the gripper apparatus 10 includes a gripper operator body, generally indicated by the numeral 19, which is slidably mounted within the aforedescribed housing, and which is made from any suitable material, as for example, aluminum. As shown in FIGS. 4 and 5, the gripper operator body 19 is provided with a pair of lightening holes 20. As shown in FIGS. 1 and 2, the gripper apparatus 10 includes a pair of gripper arms or members, generally indicated by the numerals 21 and 22, which are identical in structure, and which are made from any suitable material, as for example aluminum.

As shown in FIGS. 1 and 2, the front cover plate 12 is designated as the front cover plate for purposes of describing the structure of the gripper apparatus 10 as it is positioned in the various figures in the drawings of this application. The right side of the front cover plate 12 is secured to the right side plate 15 by a plurality of suitable cap screws 25, which are mounted through bores 26 formed through the front cover plate 12, and which extend into threaded engagement with threaded bores 27 (FIG. 3) in the right side plate 15. The front cover plate 12 is also connected to the left side plate 14, by a similar plurality of cap screws 25, which pass through bores 26 formed through the left side of the cover plate 12 and into threaded engagement with threaded bores in the left side plate 14 (not shown) which are the same as the threaded bores 27 in the right side plate 15. As shown in FIG. 3, the left end of the rear cover plate 13 is secured to the right side plate 15 by a plurality of cap screws 28, which are identical to the cap screws 25, and which pass through bores 29 formed through the rear cover plate 13 and into threaded engagement with the threaded bores 27 formed through the right side plate 15. As viewed from the right side of the gripper apparatus 10, as shown in FIG. 3, the right end of the rear cover plate 13 is also connected by a plurality of cap screws 28 to the rear side of the left side plate 14, in the same manner as the right side of the rear cover plate 13 is connected to the right side plate 15.

The cover plates 12 and 13 are also joined to the side plates 14 and 15 by a plurality of suitable dowel pins 32, which extend through suitable aligned holes 33, which are formed through the cover plates and side plates, as shown in FIG. 3. As shown in FIGS. 1, 2 and 6, the gripper apparatus 10 is provided with a plurality of mounting holes 34, which are formed through the cover plates 12 and 13 along the sides thereof, and which are aligned with threaded mating mounting holes 35 that are formed through the side plates 14 and 15, as illustrated in FIG. 3.

As shown in FIG. 1, the gripper operator body 19 is slidably mounted within the gripper apparatus housing, and it has parallel side faces 38 and 39 which are in slidable contact with the parallel inner faces 40 and 41 on the side plates 14 and 15, respectively. As shown in FIG. 3, the gripper body 19 has parallel front and rear faces 42 and 43, respectively, which are slidably mounted on the parallel inner faces 44 and 45 of the front and rear cover plates 12 and 13, respectively.

As views in FIGS. 1 through 5, it will be seen that the overall configuration of the gripper operator body 19 is rectangular block-shaped, and it has an upper end 48 which is parallel to the lower end 49. As best seen in FIG. 4, the lower end 49 of the operator body 19 has formed therein an inwardly extended outer recess, which has inwardly converging walls 50 that terminate at a transverse wall 51. A longitudinal opening 52 is formed in the transverse wall 51, and it communicates with a transverse recess 53. It will be seen that the longitudinal slot or opening 52, and transverse recess 53, form a T-shaped inner recess in the operator body 19, on the lower side thereof, and at the upper end of the recess formed by the converging walls 50. As shown in FIGS. 1, 2 and 6, each of the front and rear cover plates 12 and 13 has formed on the lower end thereof a rectangular recess which extends upwardly from the lower end thereof, and which has longitudinal side walls 56 and a transverse upper end wall 57. A power cylinder 58 is operatively mounted in said rectangular recesses in the front and rear cover plates 12 and 13, and the recess in the operator body 19 which is bounded by the walls 50. The square power cylinder 58 may be of any suitable type as, for example, it may be a pneumatic or a hydraulic cylinder. The power cylinder 58 is provided with the usual cylinder rod 59, which extends outwardly from the upper end of the power cylinder 58, as viewed in FIGS. 1 and 2. The cylinder rod 59 is provided with an enlarged head 60, on the upper end thereof, which is seated in the transverse recess 53 in the lower end of the operator body 19. The cylinder rod 59 extends through the slot 52, and its enlarged head 60 has a flange which is wider than the slot 52, so that the flange seats on the lower wall of the transverse recess 53. The cylinder rod head 60 would be slidably inserted sidewise into the transverse recess 53 before the cover plates 12 and 13 are fixedly mounted in place. The power cylinder 58 is fixedly secured in place by a plurality of suitable cap screws 61. Two of the cap screws 61 are mounted along the front and the rear of the cylinder 58, and they extend through holes 62 in the housing of the power cylinder 58 and into threaded engagement in threaded holes 63, in the front and rear cover plates 12 and 13, respectively. As shown in FIGS. 1 and 2, the power cylinder 58 is provided with the usual ports 64 and 65 for attachment to suitable conduits for conveying pressurized fluid, such as air or hydraulic oil, into the power cylinder 58, for operating the cylinder rod 59 between the positions shown in FIGS. 1 and 2. The pressurized fluid admitted into the upper port 64 moves the operator body 19 downwardly into the position shown in FIG. 1 to open the gripper arms 21 and 22. The pressurized fluid admitted into the lower port 65 operates the power cylinder 58 to move the cylinder rod 59 upwardly, so as to move the gripper arms 21 and 22 sidewardly inward, in a linear or parallel path, to grip a workpiece, as the workpiece 11.

As shown in FIGS. 1, 4 and 5, the operator body 19 is provided with a pair of slide tracks or slots 68 and 69, which are rectangular in cross section. The slots 68 and 69 are disposed on opposite sides of the operator body 19, and they communicate with each other through a hole 70, formed through the operator body 19, at the cross-over point of the slots 68 and 69. The slots 68 and 69 are disposed at right angles to each other, and they are disposed at a 45 degree angle relative to the longitudinal axis of the operator body 19. As shown in FIG. 1, the gripper arm 21 includes an anglular portion 73 and an integral longitudinal portion 74. The angular portion 73 is disposed at an angle of 45 degrees from the longitudinal axis of the operator body 19, and it is slidably mounted in the slide track 68 in the operator body 19. The gripper arm 22 is also provided with an angular portion 75, which is slidably mounted in the slot 69 in the operator body 19, and an integral longitudinal portion 76.

As shown in FIGS. 1 and 2, the front cover plate 12 is provided with a transverse, horizontal cam slot 79 which is perpendicular to the longitudinal axis of the operator body 19, and which has rounded ends. A cam roller 80 is rollably mounted in the cam slot 79. A dowel pin 81 has one end fixedly mounted, as by a press fit, in a bore 82 which is formed through the inner end of the gripper arm portion 73 (FIG. 10) of the gripper arm 21. As shown in FIG. 3, the cam roller 80 is provided with an axial bore 87 in which is rollably mounted the other end of the dowel pin 81.

As shown in FIGS. 1 and 2, the rear cover plate 13 is provided with a transverse, horizontal cam slot 83 which is perpendicular to the longitudinal axis of the operator body 19, and which has rounded ends. A cam roller 84 is rollably mounted in the cam slot 83. A dowel pin 85 has one end fixedly mounted, as by a press fit, in a bore 86 (FIG. 3) which is formed through the inner end of the arm portion 75 of the gripper arm 22. The other end of the dowel pin 85 is rollably mounted in an axial bore 88 in the cam roller 84. As shown in FIGS. 1, 8 and 9, the side plates 14 and 15 are each provided with an arcuate recess 89 and 90, respectively, on the inner side thereof. The recesses 89 and 90 are aligned with the outer rounded ends of the cam slots 83 and 79, respectively.

As shown in FIGS. 1 and 2, each of the gripper arms 21 and 22 has operatively mounted thereon a gripper jaw 91 and 103, respectively. The jaw 91 is carried on a mounting arm 92, which is releasably secured to the longitudinal gripper arm portion 74 by a pair of suitable machine screws 93. The machine screws 93 are slidably mounted through bores 94 which are formed through the lower end of the mounting arm 92, and they extend into threaded engagement with threaded bores 95 that are formed through the gripper arm portion 74. The mounting arm 92 has an integral, outwardly extended, perpendicular flange 96, which rests on the upper end 97 of the gripper arm portion 74. The gripper jaw 91 is releasably secured to the outer end of the mounting arm 92 by a pair of suitable machine screws 98, which pass through bores 99 formed through the upper end of the mounting arm 92 and into threaded engagement with threaded bores 100, which are formed in the outer side of the gripper jaw 91. The gripper jaw 91 is shown as being provided with a V-shaped seat 115 for engagement with the rounded outer surface of the cylindrical workpiece 11.

The gripper jaw 103 is carried on a support arm 104, which is releasably secured to the outer end of the longitudinal gripper arm portion 76, by a pair of suitable machine screws 105. The machine screws 105 pass through bores 106 in the lower end of the mounting arm 104 and into threaded engagement with threaded bores 107 which are formed through the longitudinal gripper arm portion 76. The mounting arm 104 has an integral, outwardly extended, perpendicular flange 108, which seats on the upper end 109 of the longitudinal gripper arm portion 76. The gripper jaw 103 is secured to the outer end of the mounting arm 104 by a pair of suitable machine screws 110, which pass through bores 111 in the mounting arm 104, and into threaded engagement with threaded bores 112 in the gripper jaw 103. The gripper jaw 103 is provided with a V-shaped seat 116 for engagement with the rounded outer surface of the cylindrical workpiece 11. The mounting arms 92 and 104, and the gripper jaws 91 and 103, may be made from any suitable material, as for example aluminum.

In use, the gripper apparatus 10 would be operatively mounted on a conventional robotic arm, or similar structure, for moving said apparatus, as desired. In order to grip the workpiece 11, pressurized fluid is admitted into the lower port 65, for operating the power cylinder 58 in an upward direction so as to move the operator body 19 upwardly, to the position shown in FIG. 2, for bringing the gripper jaws 91 and 103 into gripping engagement with the workpiece 11. The robotic arm may then be moved to a desired position for putting the workpiece 11 in a selected position for a sequential manufacturing operation, or the like. At the new selected position, the pressurized fluid would be exhausted from the lower port 65, and pressurized fluid would be admitted into the upper port 64 for operating the power cylinder 58 in a downward direction to move the operator body 19 downwardly, to the position shown in FIG. 1, for releasing the workpiece 11.

The V-shaped seats or faces 115 and 116 on the gripper jaws 91 and 102, respectively, may be changed in accordance with the outer shape of the workpiece 11. For example, if the workpiece 11 were to have parallel straight sides, then the gripper jaws 91 and 103 would be provided with straight gripping seats or faces instead of the V-shaped faces 115 and 116.

The range of the linear movement of the gripper jaws 91 and 103 may be changed by merely adding different size gripper jaws, which may be shorter or longer, as desired. The linear or parallel inward and outward movements of the gripper jaws 91 and 103 are effected by the 45 degree disposition of the arm portions 73 and 75 of the gripper arms 21 and 22, respectively, and the mating 45 degree slots 68 and 69, respectively, and the functioning of the cam rollers 80 and 84 in the transverse cam slots 79 and 83, respectively.

FIG. 12 illustrates a second embodiment 10a of the invention, and the parts of the second embodiment of FIG. 12 which are the same as the parts of the first embodiment 10 illustrated in FIGS. 1 through 11, are marked with the same reference numerals followed by the small letter "a". The only difference between the embodiment 10a of FIG. 12 and the first embodiment is the difference in the shape of the gripper jaws 91a and 103a. The gripper jaws 91a and 103a have been provided with curved or arcuate outer surfaces 117 and 118, respectively, which are adapted for gripping engagement with the circular inner diameter 119 of the cylindrical or annular workpiece 11a. The second embodiment 10a of FIG. 12 thus illustrates how the gripper jaws 91a and 103a can be mounted on the outer side of the mounting arms 92a and 104a, to provide an inner diameter gripper apparatus. In operation, the second embodiment 10a of FIG. 12 would operate in a reverse direction to the direction of movements of the embodiment 10 of FIGS. 1 and 2. That is, the operator body 19a would be moved by the power cylinder upwardly to move the mounting arms 92a and 104a towards each other to release the gripper jaws 91a and 103a from the inner diameter 119 of the workpiece 11a. The operator body 19a would be moved downwardly, as viewed in FIG. 12, into the housing of the gripper apparatus 10a so as to move the mounting arms 92a and 104a outwardly, and the gripper jaws 91a and 103a outwardly into gripping engagement with the inner diameter 119 of the workpiece 11a.

The external gripper jaws 91 and 103 and the internal gripper jaws 91a and 103a engage a workpiece along a plurality of gripping lines to permit gripping of a workpiece without slippage if the gripping apparatus 10 or 10a is rotated to a position above the workpiece.

What is claimed is:

1. A gripping apparatus, characterized in that it comprises:
   (a) a housing having a longitudinal and a transverse axis;
   (b) a gripper operator body, having a longitudinal and a transverse axis, and further having a front side surface and a rear side surface, slidably mounted in said housing for longitudinal movement therein;
   (c) a pair of gripper arms slidably mounted in a pair of angled gripper arm slots which are disposed in a criss-cross manner, and which are formed in said operator body with one gripper arm slot in one of said side surfaces of the operator body and the other gripper arm slot in the other of said side surfaces of the operator body;
   (d) said gripper arms each selectively carrying a gripper jaw for internal or external gripping engagement with a workpiece, and each of the gripper jaws being constructed and arranged to engage a workpiece along a plurality of gripping lines to permit gripping of a workpiece without slippage if the gripping apparatus is rotated to a position above the workpiece;
   (e) cam means for restraining each of said gripper arms against movement relative to the operator body, axially of the longitudinal axis of the operator body, but which permits crosswise movement of the gripper arms relative to the longitudinal axis of said operator body, and toward and away from a workpiece, to move the gripper jaws carried by the gripper arms in straight line travel paths; and,
   (f) said gripper operator body having an outer recess formed in the lower end thereof with a shaped inner recess communicating with said outer recess; and,
   (g) a power cylinder, mounted in said housing and nested in the outer recess in the operator body when the gripping apparatus is inoperative and having an operating rod with an end connectively engageable in the shaped inner recess, for moving said operator body longitudinally in said housing, whereby when said operator body is moved in one longitudinal direction, the gripper jaws on the gripper arms are moved along straight line travel paths into gripping engagement with a workpiece, and when the operator body is moved in the other longitudinal direction, the gripper jaws are retracted from the workpiece along the same straight line travel paths.

2. A gripping apparatus, as defined in claim 1, characterized in that said housing comprises:
   (a) a front cover plate and a rear cover plate; and,
   (b) a pair of side plates fixed to said cover plates.

3. A gripping apparatus, as defined in claim 2, characterized in that and comprising, gripper arm slots each disposed at an acute angle relative to the longitudinal axes of the housing and operator body, with each gripper arm slot being disposed with its upper end on one side of said longitudinal axes.

4. A gripping apparatus, as defined in claim 3, characterized in that said comprising, power means for moving said operator body.

5. A gripping apparatus, as defined in claim 4, characterized in that said cam means comprises:
   (a) a first crosswise cam slot formed in one cover plate, and a cam roller rollably mounted in said first crosswise cam slot and being attached to a first one of said gripper arms; and,
   (b) a second crosswise cam slot formed in the other cover plate, and a cam roller rollably mounted in said second crosswise cam slot and being attached to a second one of said gripper arms.

6. A gripping apparatus, as defined in claim 5, characterized in that and comprising, said gripper jaws on said gripper arms being detachably mounted on said gripper arms.

7. A gripping apparatus, as defined in claim 6, characterized in that and comprising, gripper jaw straight travel paths, each disposed at a right angle to the longitudinal axis of said housing.

* * * * *